US012560233B2

(12) United States Patent (10) Patent No.: US 12,560,233 B2
Yu (45) Date of Patent: Feb. 24, 2026

(54) BATTERY ELECTRIC VEHICLE TRANSMISSION WITH DISENGAGING FUNCTION

(71) Applicant: ZHEJIANG SIEKON TRANSMISSION TECHNOLOGY CO., LTD., Jiaxing (CN)

(72) Inventor: Wenyong Yu, Jiaxing (CN)

(73) Assignee: ZHEJIANG SIEKON TRANSMISSION TECHNOLOGY CO., LTD., Jiaxing (CN)

( * ) Notice: Subject to any disclaimer, the term of this patent is extended or adjusted under 35 U.S.C. 154(b) by 475 days.

(21) Appl. No.: 18/042,687

(22) PCT Filed: Dec. 14, 2022

(86) PCT No.: PCT/CN2022/139053
§ 371 (c)(1),
(2) Date: Feb. 23, 2023

(87) PCT Pub. No.: WO2024/060429
PCT Pub. Date: Mar. 28, 2024

(65) Prior Publication Data
US 2024/0288065 A1 Aug. 29, 2024

(30) Foreign Application Priority Data

Sep. 24, 2022 (CN) .......................... 202211168537.X

(51) Int. Cl.
*F16H 61/04* (2006.01)
*F16H 37/08* (2006.01)
(Continued)

(52) U.S. Cl.
CPC ..... *F16H 61/0403* (2013.01); *F16H 37/0813* (2013.01); *F16H 59/42* (2013.01);
(Continued)

(58) Field of Classification Search
CPC .. F16H 61/0403; F16H 37/0813; F16H 59/42; F16H 59/68; F16H 61/32;
(Continued)

(56) References Cited

U.S. PATENT DOCUMENTS

| | | |
|---|---|---|
| 2008/0047380 A1 | 2/2008 | Abramov |
| 2017/0037936 A1 | 2/2017 | Park et al. |
| 2019/0126739 A1 | 5/2019 | Cho et al. |

FOREIGN PATENT DOCUMENTS

| | | |
|---|---|---|
| CN | 104279311 | 1/2015 |
| CN | 105065658 | 11/2015 |

(Continued)

OTHER PUBLICATIONS

MTL Translations from PE2E of CN 108757898 A (Year: 2018).*
(Continued)

*Primary Examiner* — Jason D Shanske
*Assistant Examiner* — Al-Birr Rahman Chowdhury
(74) *Attorney, Agent, or Firm* — Sand, Sebolt & Wernow Co., LPA

(57) ABSTRACT

A battery electric vehicle transmission with a disengaging function includes an input shaft, an output shaft, and an intermediate shaft. An input shaft gear is arranged around the input shaft and the input shaft is engaged with an intermediate gear on the intermediate shaft via the input shaft gear, the intermediate gear is engaged with an output gear on the output shaft, the input shaft is connected with an auxiliary drive motor, and the output shaft is connected with vehicle wheels. The transmission further includes a synchronizer, and an engagement sleeve of the synchronizer is driven by a shift mechanism to switch between an engagement position and a disengagement position of the input shaft gear. The shift mechanism includes a BLDC motor, a (Continued)

401 shift gear and a shift fork, the shift gear is driven by the BLDC motor to drive the shift fork to move linearly.

4 Claims, 4 Drawing Sheets

(51) Int. Cl.

| | |
|---|---|
| *F16H 59/42* | (2006.01) |
| *F16H 59/68* | (2006.01) |
| *F16H 61/32* | (2006.01) |
| *F16H 63/30* | (2006.01) |
| *F16H 63/32* | (2006.01) |

(52) U.S. Cl.

CPC ............. *F16H 59/68* (2013.01); *F16H 61/32* (2013.01); *F16H 63/304* (2013.01); *F16H 63/32* (2013.01); *F16H 2061/0422* (2013.01); *F16H 2061/0481* (2013.01); *F16H 2061/0488* (2013.01); *F16H 2061/326* (2013.01); *F16H 2063/3056* (2013.01)

(58) Field of Classification Search

CPC ................... F16H 63/304; F16H 63/32; F16H 2061/0422; F16H 2061/0481; F16H 2061/0488; F16H 2061/326; F16H 2063/3056; F16H 3/091; F16H 2063/3093; F16H 63/502; F16H 2063/504; F16H 3/02; F16H 48/38; B60K 17/356; B60Y 2200/91; Y02T 10/72; F16D 23/02; H02K 7/116

See application file for complete search history.

(56) References Cited

FOREIGN PATENT DOCUMENTS

| | | | | | |
|---|---|---|---|---|---|
| CN | 106246849 | | 12/2016 | | |
| CN | 108757898 A | * | 11/2018 | ........... | F16H 57/023 |
| CN | 109854700 A | | 6/2019 | | |
| CN | 109973608 | | 7/2019 | | |
| CN | 210978405 U | | 7/2020 | | |
| CN | 112303194 | | 2/2021 | | |
| CN | 112503108 | | 3/2021 | | |
| CN | 213808692 | | 7/2021 | | |
| CN | 114811036 | | 7/2022 | | |
| CN | 114834247 A | * | 8/2022 | ............. | B60K 23/08 |
| CN | 115467942 A | | 12/2022 | | |
| DE | 102018218535 | | 4/2020 | | |
| EP | 3521092 | | 8/2019 | | |
| EP | 4227554 A1 | * | 8/2023 | ............. | F16H 3/089 |
| JP | 2008075718 | | 4/2008 | | |
| JP | 2019178740 | | 10/2019 | | |
| KR | 20120138193 | | 12/2012 | | |
| WO | WO-2022105191 A1 | * | 5/2022 | ............. | F16H 3/091 |

OTHER PUBLICATIONS

MTL Translations from Espacenet of CN 114834247 A (Year: 2022).*

ISR—PCT/CN2022/139053, May 24, 2023.

The State Intellectual Property Office of People's Republic of China. First Search Report for CN Application No. 202211168537.X and English translation, mailed Mar. 2, 2023.

The State Intellectual Property Office of People's Republic of China. First Office Action for CN Application No. 202211168537.X and English translation, mailed Mar. 9, 2023.

The State Intellectual Property Office of People's Republic of China. Second Office Action for CN Application No. 202211168537.X and English translation, mailed Apr. 15, 2023.

The State Intellectual Property Office of People's Republic of China. Decision of Rejection for CN Application No. 202211168537.X and English translation, mailed May 19, 2023.

Search Report for EP Application No. 22 850 703.4 and English translation, mailed Sep. 10, 2024.

Notice of Reasons for Refusal for JP Application No. 2023-510370 and English translation, mailed Nov. 5, 2024.

Decision of Refusal for JP Application No. 2023-510370 and English translation, mailed Mar. 18, 2025.

First Office Action for EP Application No. 22 850 703.4 and English translation, mailed Aug. 5, 2025.

* cited by examiner

311

BATTERY ELECTRIC VEHICLE TRANSMISSION WITH DISENGAGING FUNCTION

REFERENCE TO RELATED APPLICATIONS

This application is a national stage filing under 35 U.S.C. § 371 of international application number PCT/CN2022/139053, filed Dec. 14, 2022, which claims priority to Chinese patent application No. 202211168537.X filed Sep. 24, 2022. The contents of these applications are incorporated herein by reference in their entirety.

TECHNICAL FIELD

The disclosure belongs to the technical field of power assemblies of battery electric vehicles, and particularly relates to the field of transmissions of power assemblies of battery electric vehicles.

BACKGROUND

Since 2020, new energy vehicles have gone through explosive growth, and are increasingly accepted by users.

Most of high-performance battery electric vehicles use four-wheel drive structure, which is not used in traditional fuel vehicles. The battery electric vehicle is provided with an engine and a transfer case. The four-wheel drive battery electric vehicles use two independent sets of electric drive assembly structures at the front and back.

In the four-wheel drive battery electric vehicle, the front and rear electric drive assemblies may be driven independently. The four-wheel drive or 2-wheel drive mode may be realized via a control system. The front and rear can be jointly driven in case of overspeed, climbing, and the like. Only the main drive may be used under normal working conditions.

However, for ordinary four-wheel drive vehicles, if the auxiliary drive does not have a disengaging function, some adverse consequences may cause when the auxiliary drive does not work. First, when the auxiliary drive does not work, the auxiliary drive will be pulled back by the wheels to rotate at a high speed, which will cause additional friction loss and gear oil mixing loss when a transmission system gear, bearing and motor rotor rotate at a high speed. Second, high-speed idling will also shorten the service life of components. Third, for the current new energy motor using a permanent magnet motor, the permanent magnet will generate eddy current loss in a stator core, and the motor is in a discharge state. If the speed is too high, the back electromotive force will increase a DC lead voltage. Generally, the over-voltage problem will be solved through a weak magnetic current, which will also introduce copper loss, or otherwise, capacitor and IGBT breakdown risks will cause.

For the problems caused by the permanent magnet motor mentioned above, some companies use induction motor as the auxiliary drive, but the induction motor has low efficiency at a low speed and in a light load condition, and the control is complex.

SUMMARY

Aiming at the shortages of a four-wheel drive battery electric vehicle, the disclosure provides a design scheme of a battery electric vehicle transmission with a disengaging function, which effectively solves all the above problems, and improves a driving range of the whole vehicle and the service life of a power assembly.

The working principle of the disclosure may be described as follows. In the four-wheel drive battery electric vehicle, the disengaging function is added to a transmission system of the auxiliary drive power assembly, and the auxiliary drive can be in the working stating or in a disengaging state according to the driving requirements of the vehicle.

The disengaging function of the disclosure may be described as follows. A miniature brushless direct-current motor (BLDC motor) and a reducing mechanism are used to rotate a shift gear to drive a shift fork to move, and the shift fork drives a synchronizer and an engagement sleeve to realize the power transmission and interruption of a transmission gear.

The function enables the auxiliary drive of the four-wheel drive vehicle to have two gears: a forward gear (gear D) and a neutral gear (gear N).

When the four-wheel drive battery electric vehicle is running, the above auxiliary drive with a disengaging function may be configured to achieve instant switching between 2-wheel drive and four-wheel drive under various working conditions, which reduces the power consumption of the whole vehicle and increases the driving range.

The disengaging function of the disclosure may further be described as follow: The automation control is realized by a micro control unit (MCU), a BLDC angle sensor, a shift fork position sensor, and a speed sensor of the input shaft gear to realize automation control. The MCU is arranged to control the auxiliary drive motor to output and to control the BLDC motor to drive a disengagement mechanism to disengage the output shaft from the output shaft gear when a battery electric vehicle is switched from gear D to gear N in motion. The shift fork position sensor monitors the position of the shift fork and transmits data to the MCU in the executing process, the motor angle sensor in the BLDC motor accurately calculates a motion angle and transmits the data to the MCU. The MCU is arranged to control a rotating speed of the auxiliary drive motor to be consistent with the speed of the output shaft gear according to a signal sent by the speed sensor of the input shaft gear when the auxiliary drive is switched from the gear N to the gear D in motion, the MCU then controls the BLDC motor to execute the engagement of the synchronizer until the BLDC angle sensor and the shift fork position sensor confirm that the auxiliary drive motor enters the normal working state after the gear shift is completed.

Numeral references are shown as follows: 301 refers to input shaft, 302 refers to deep groove ball bearing, 303 refers to shift fork, 304 refers to synchronizer, 305 refers to input shaft gear, 306 refers to needle bearing, 307 refers to deep groove ball bearing, 308 refers to bushing, 309 refers to locking bolt, 310 refers to large gear of intermediate shaft, 311 refers to intermediate shaft, 312 refers to cone bearing, 313 refers to differential gear ring, 314 refers to differential, 315 refers to cone bearing, 401 refers to BLDC motor, 402 refers to transmission gear of disengaging mechanism, 403 refers to cam, 404 refers to shift fork, 405 refers to shift fork shaft, and 204 refers to shift fork position sensor.

DETAILED DESCRIPTION

The technical solution in the embodiments of the disclosure will be described clearly and completely hereinafter with reference to the accompanying drawings in the embodiments of the disclosure. Apparently, the embodiments described are some, but not all embodiments of the disclosure. All the other embodiments derived by those having ordinary skills in the art on the basis of the embodiments of the disclosure without going through creative efforts shall all fall within the protection scope of the disclosure.

Figure 1:
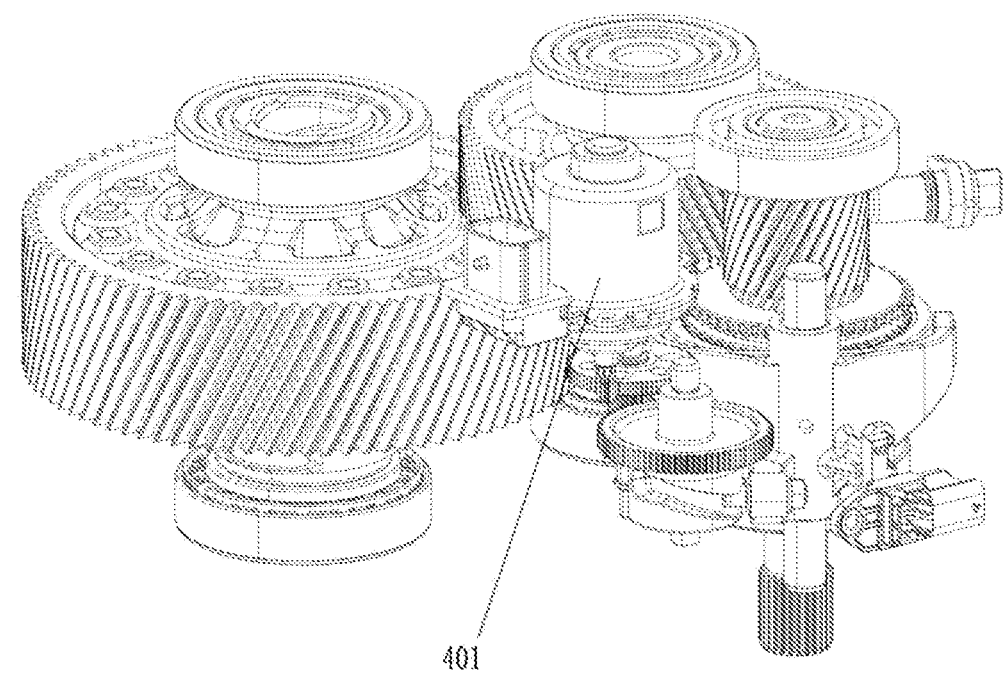
FIG. 1 is an axial diagram of a gear with a disengaging function and a disengaging mechanism.
Figure 2:
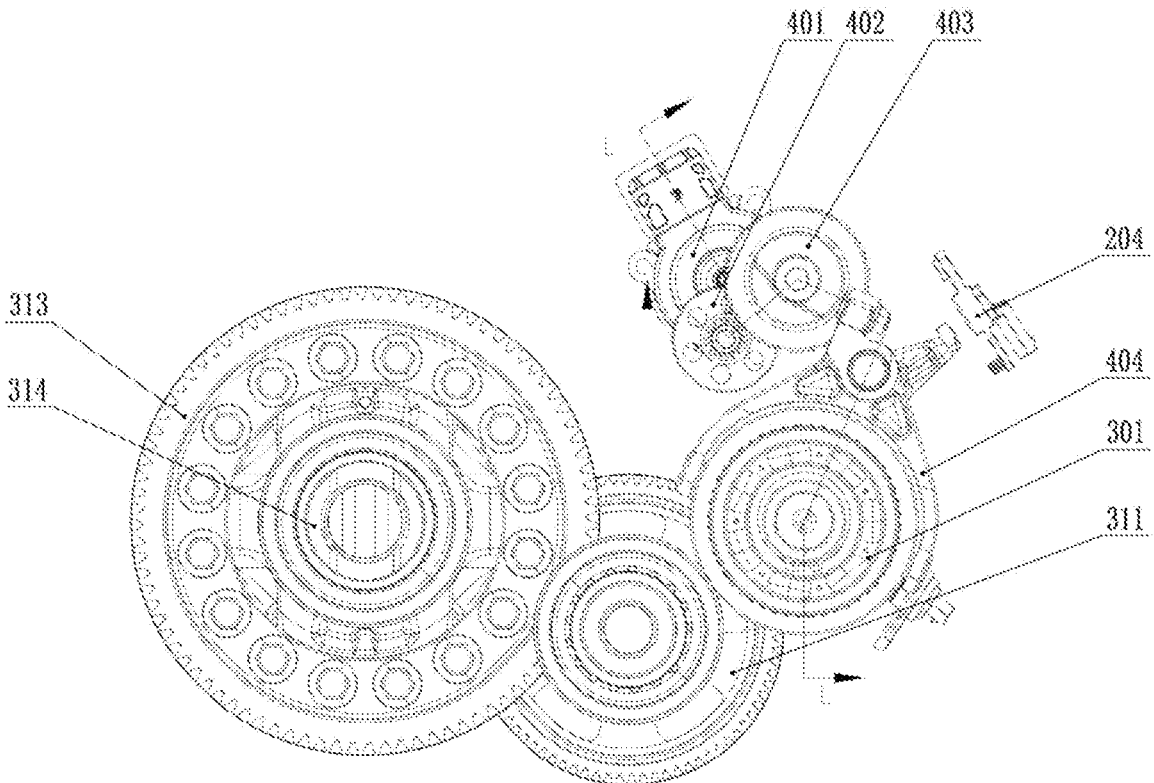
FIG. 2 is a schematic diagram of transmission and disengaging of the gear with a disengaging function.
Figure 3:
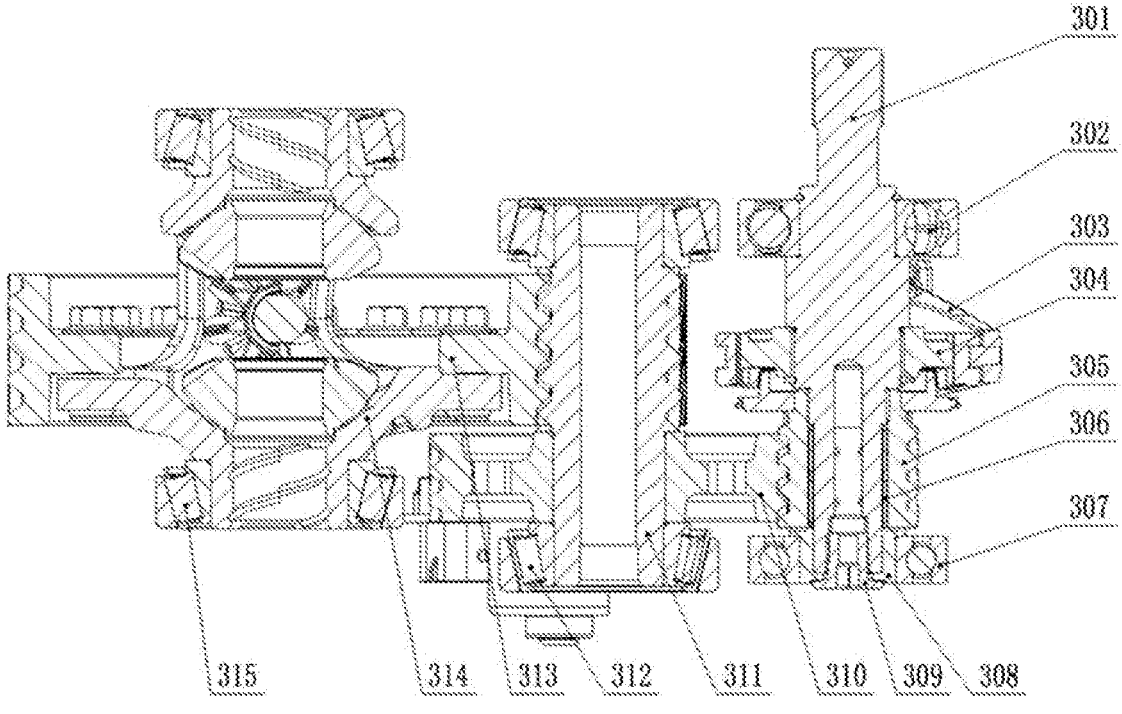
FIG. 3 is a schematic diagram of transmission of the gear with a disengaging function.
Figure 4:
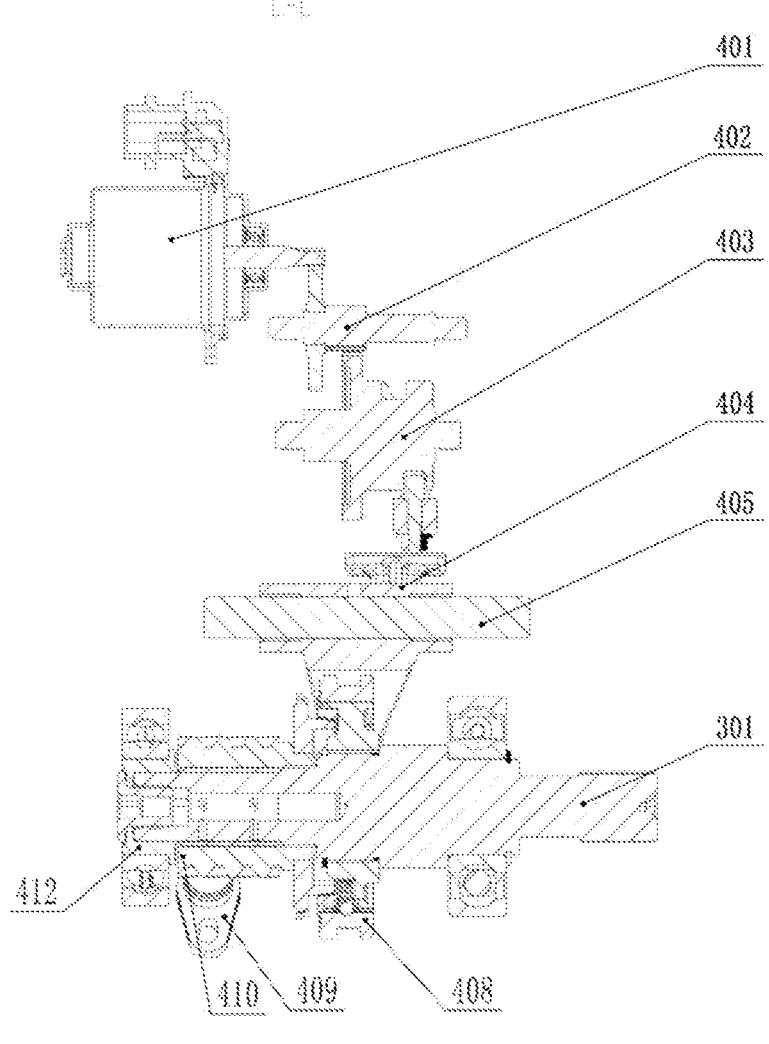
FIG. 4 is a schematic diagram of the disengaging mechanism.

As shown in FIG. 2, FIG. 3 and FIG. 4, a battery electric vehicle transmission with a disengaging function mainly includes an input shaft 301, an input shaft bearing 302, a needle bearing 306, a synchronizer 304, an input shaft gear 305, an intermediate shaft 311, a large gear 310 of intermediate shaft, a differential gear ring 313, a differential 314, a BLDC motor 401, a transmission gear 402 of disengaging mechanism, a shift gear 403, a shift fork 404, a shift fork shaft 405, a shift fork position sensor 204, a speed sensor 409 and the like.

Continuously, the power transmission is described with reference to FIG. 3, the input shaft 301 is coupled with a motor shaft, the input shaft is pressed with the synchronizer 304 and the input shaft gear 305, the needle bearing 306 is installed between the input shaft 305 and the input shaft 301, the input shaft 305 is engaged with the large gear 310 of the intermediate shaft, the large gear 310 of the intermediate shaft and the intermediate shaft 311 are integrated via a spline or in an interference manner, and the small gear of the intermediate shaft 311 is engaged with the differential gear ring 313. The shift gear 403 is provided with a guide groove, the shift fork 404 is provided with a guide block matched with the guide groove, and the linear movement of the shift fork 404 is realized by the matching when the shift gear 403 rotates.

When the transmission is in gear D, the synchronizer 304 moves down to enable the engagement sleeve to be engaged with the input shaft gear 305. At this time, the power of the auxiliary drive motor may be transmitted to the input shaft gear 305 via the engagement sleeve in the synchronizer, then may be transmitted to the differential gear ring 313 via the intermediate shaft 311, and finally may be transmitted to the wheels.

When the transmission is in gear N, the synchronizer moves up to separate the engagement sleeve from the input shaft 301. At this time, if the vehicle is running, the input shaft gear 305 is reversely driven to rotate overhead on the input shaft 301 without rotating the input shaft and the auxiliary drive motor.

With reference to FIG. 4, the shift function and structure are further described. The shift mechanism with a disengaging function is driven by the miniature BLDC motor 401, decelerates through a secondary gear 202, drives the shift gear 403 to rotate, and then drives the shift fork 404 to move through the guide groove of the shift gear 403 to disengage/engage the synchronizer 408 from/with the engagement gear, and thus completing the switchover between the gear N and the gear D of the transmission.

If the vehicle is required to be switched from the gear D to the gear N in motion, the MCU controls the output of the auxiliary drive motor, and BLDC motor 401 drives the disengaging mechanism to disengage the input shaft 412 from the input shaft gear 410. In the executing process, the shift fork position sensor (204 in FIG. 2) monitors the position of the shift fork to ensure correct execution. Moreover, the motor angle sensor in the BLDC motor may accurately calculate a motion angle.

When the auxiliary drive is required to be switched from the gear N to the gear D in motion, a motor controls a rotating speed of the motor to be consistent with the speed of the output shaft gear according to a signal sent by the speed sensor of the input shaft gear in order to ensure the successful engagement of the input shaft gear with the engagement gear of the synchronizer, then the BLDC motor executes the engagement of the synchronizer until the BLDC angle sensor and the shift fork position sensor confirm that the drive motor enters the normal working state after the gear shift is completed.

In FIG. 4, the needle bearing is installed between the input shaft gear and the input shaft, the axial limit of the needle bearing is controlled by a bushing 412, the bushing 412 is locked on the input shaft via a hollow bolt, which may ensure that lubricating oil may enter the input shaft via a central hole of the hollow bolt, and lubricate a needle through an axial oil hole.

The disclosure further provides a drive control method of a battery electric vehicle, wherein the battery electric vehicle is a four-wheel drive structure and is provided with the transmission with a disengaging function as described above. The disengaging function can realizes the automation control by a micro control unit MCU, a BLDC angle sensor, a shift fork position sensor, and a speed sensor of the input shaft gear. The MCU is arranged to control the auxiliary drive motor to output and to control the BLDC motor to drive a disengagement mechanism to disengage the output shaft from the output shaft gear when a battery electric vehicle is switched from gear D to gear N in motion. The shift fork position sensor monitors the position of the shift fork and transmits data to the MCU in the executing process, to ensure accurate executing. The motor angle sensor in the BLDC motor can accurately calculate a motion angle and transmit the data to the MCU; to ensure accurate executing. The MCU is arranged to control a rotating speed of the auxiliary drive motor to be consistent with the speed of the output shaft gear according to a signal sent by the speed sensor of the input shaft gear when the auxiliary drive is switched from the gear N to the gear D in motion, the MCU then controls the BLDC motor to execute the engagement of the synchronizer until the BLDC angle sensor and the shift fork position sensor confirm that the auxiliary drive motor enters the normal working state after the gear shift is completed.

Figure 5:
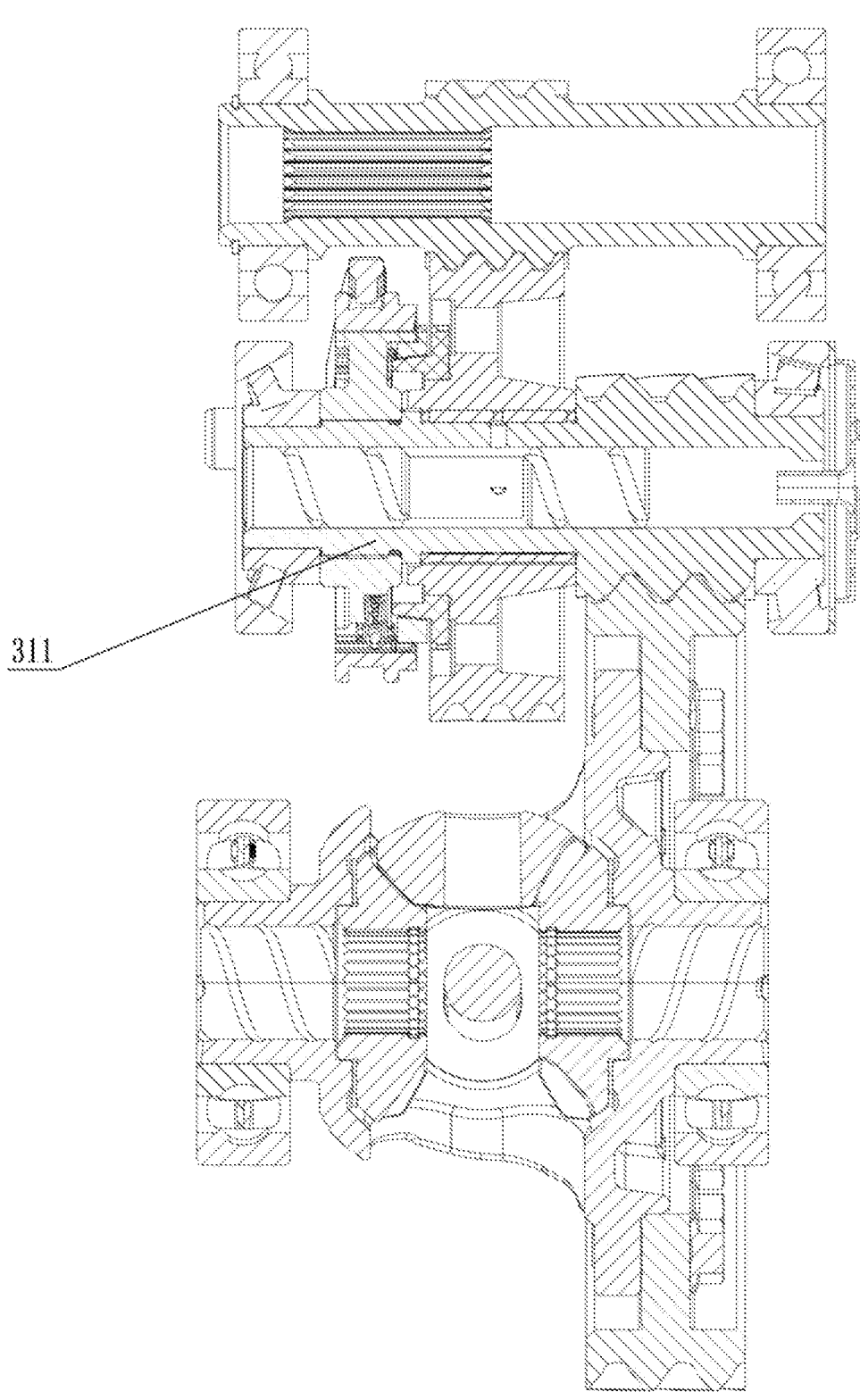
FIG. 5 is a schematic diagram of an intermediate shaft with the disengaging mechanism.

The above description is the preferred embodiments of the disclosure, but not intended to limit the protection scope of the disclosure. All the technical solutions belonging to the concept of the disclosure shall all fall within the protection scope of the disclosure. As shown in FIG. 5, the synchronizer is installed in the large gear of the intermediate shaft, and the input shaft gear and the input shaft are integrated, which can ensure the implementation of the disclosure as well, and also shall fall within the protection scope of the disclosure.

What is claimed is:

1. A battery electric vehicle transmission with a disengaging function, comprising an input shaft, an output shaft and an intermediate shaft, wherein an input shaft gear is arranged around the input shaft and the input shaft is engaged with a large gear of the intermediate shaft via the input shaft gear, the output shaft is a differential, and a small gear of the intermediate shaft is engaged with a differential gear ring, the input shaft is connected with an auxiliary drive motor, and the output shaft is connected with vehicle wheels;

the transmission further comprises a synchronizer, wherein an engagement sleeve of the synchronizer is driven by a shift mechanism to switch between an engagement position at which the engagement sleeve is engaged with the input shaft gear and a disengagement position at which the engagement sleeve is disengaged from the input shaft gear; the shift mechanism comprises a BLDC motor, a shift gear and a shift fork, the shift gear is driven by the BLDC motor to drive the shift fork to move linearly, and the switching of the engagement sleeve of the synchronizer with respect to the input shaft gear is driven via the linear movement of the shift fork; and wherein a needle bearing is arranged between the input shaft gear and the input shaft, an axial limit of the needle bearing is controlled by a bushing, and the bushing is locked on the input shaft via a hollow bolt, such that lubricating oil enters the input shaft via a central hole of the hollow bolt, and lubricate a needle through an axial oil hole.

2. The battery electric vehicle transmission with a disengaging function of claim 1, further comprising a micro control unit MCU, a BLDC angle sensor, a shift fork position sensor, and a speed sensor of the input shaft gear to realize automation control, wherein the MCU is arranged to control the auxiliary drive motor to output and to control the BLDC motor to drive a disengagement mechanism to disengage the output shaft from an output shaft gear when a battery electric vehicle is switched from gear D to gear N in motion, the shift fork position sensor monitors a position of the shift fork and transmits data to the MCU in an executing process, the motor angle sensor in the BLDC motor accurately calculates a motion angle and transmits the data to the MCU; the MCU is arranged to control a rotating speed of the auxiliary drive motor to be consistent with a speed of the output shaft gear according to a signal sent by the speed sensor of the input shaft gear when the auxiliary drive is switched from the gear N to the gear D in motion, the MCU then controls the BLDC motor to execute engagement of the synchronizer until the BLDC angle sensor and the shift fork position sensor confirm that the auxiliary drive motor enters a normal working state after gear shift is completed.

3. The battery electric vehicle transmission with a disengaging function of claim 1, wherein the shift gear is provided with a guide groove, the shift fork is provided with a guide block matched with the guide groove, and the linear movement of the shift fork is realized by the matching when the shift gear rotates.

4. A drive control method of a battery electric vehicle, wherein the battery electric vehicle is a four-wheel drive structure and is provided with the battery electric vehicle transmission of claim 1; the control method comprises:

controlling, by a MCU, the auxiliary drive motor to output and controlling the BLDC motor to drive a disengagement mechanism to disengage the output shaft from an output shaft gear when a battery electric vehicle is switched from gear D to gear N in motion, monitoring, by a shift fork position sensor, a position of the shift fork and transmits data to the MCU in an executing process, and accurately calculating, by a motor angle sensor in the BLDC motor, a motion angle and transmitting the data to the MCU; and controlling, by the MCU, a rotating speed of the auxiliary drive motor to be consistent with the speed of the output shaft gear according to a signal sent by the speed sensor of the input shaft gear when the auxiliary drive is switched from the gear N to the gear D in motion, and then, controlling, by the MCU, the BLDC motor to execute engagement of the synchronizer until a BLDC angle sensor and the shift fork position sensor confirm that the auxiliary drive motor enters the normal working state after the gear shift is completed.

\*     \*     \*     \*     \*